(12) United States Patent
Gabriel et al.

(10) Patent No.: US 7,451,723 B1
(45) Date of Patent: *Nov. 18, 2008

(54) MULTIPURPOSE RAT CAGE

(75) Inventors: George S. Gabriel, Seaford, DE (US);
Neil E. Campbell, Eden, MD (US);
Chin Soo Park, Salisbury, MD (US);
Albert P. Ruggieri, deceased, late of
Flourtown PA (US); by Jessica R. Matthews, legal representative,
Springfield, VA (US); John E. Sheaffer,
Perryville, MD (US); Dale Murray,
Elkton, MD (US); Eric A. Deitrich,
Woodbine, MD (US); Lynn Irwin,
Seaford, DE (US); Rodney Gerringer,
Belcamp, MD (US)

(73) Assignee: Lab Products Inc., Seaford, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/173,134

(22) Filed: Oct. 15, 1998

Related U.S. Application Data

(63) Continuation-in-part of application No. 09/106,389, filed on Jun. 26, 1998, now Pat. No. 6,041,741.

(51) Int. Cl.
*A01K 1/03* (2006.01)
(52) U.S. Cl. ..................... 119/456; 119/417

(58) Field of Classification Search ............... 119/418,
119/419, 454, 470, 475, 480, 464, 458
See application file for complete search history.

(56) References Cited

U.S. PATENT DOCUMENTS

| | | | | |
|---|---|---|---|---|
| 3,244,147 A | * | 4/1966 | Kogeichi et al. | 119/458 |
| 3,585,968 A | * | 6/1971 | Stone, Jr. | 119/458 |
| 3,822,673 A | * | 7/1974 | Benny | 119/458 |
| 3,896,768 A | * | 7/1975 | Galloway | 119/458 |
| 3,978,819 A | * | 9/1976 | Lovitt | 119/458 |
| 4,206,720 A | * | 6/1980 | Ruggeri et al. | 119/458 |
| 4,690,100 A | * | 9/1987 | Thomas | 119/419 |
| 4,840,142 A | * | 6/1989 | Ishikawa et al. | 119/458 |
| 5,749,321 A | * | 5/1998 | Ikuse et al. | 119/458 |
| 5,894,816 A | | 4/1999 | Coiro, Sr. et al. | 119/417 |

OTHER PUBLICATIONS

Lab Products Catalog, 1997.

* cited by examiner

*Primary Examiner*—Son T. Nguyen
(74) *Attorney, Agent, or Firm*—Stroock & Stroock & Lavan LLP

(57) ABSTRACT

A multipurpose rat cage is provided for housing a plurality of different species of rodents therein. The rat cage includes a cage bottom having a plurality of integral side walls, a floor and an open top end. The floor has a length and a width such that the area of the floor is between 80 square inches and a 140 square inches.

15 Claims, 7 Drawing Sheets

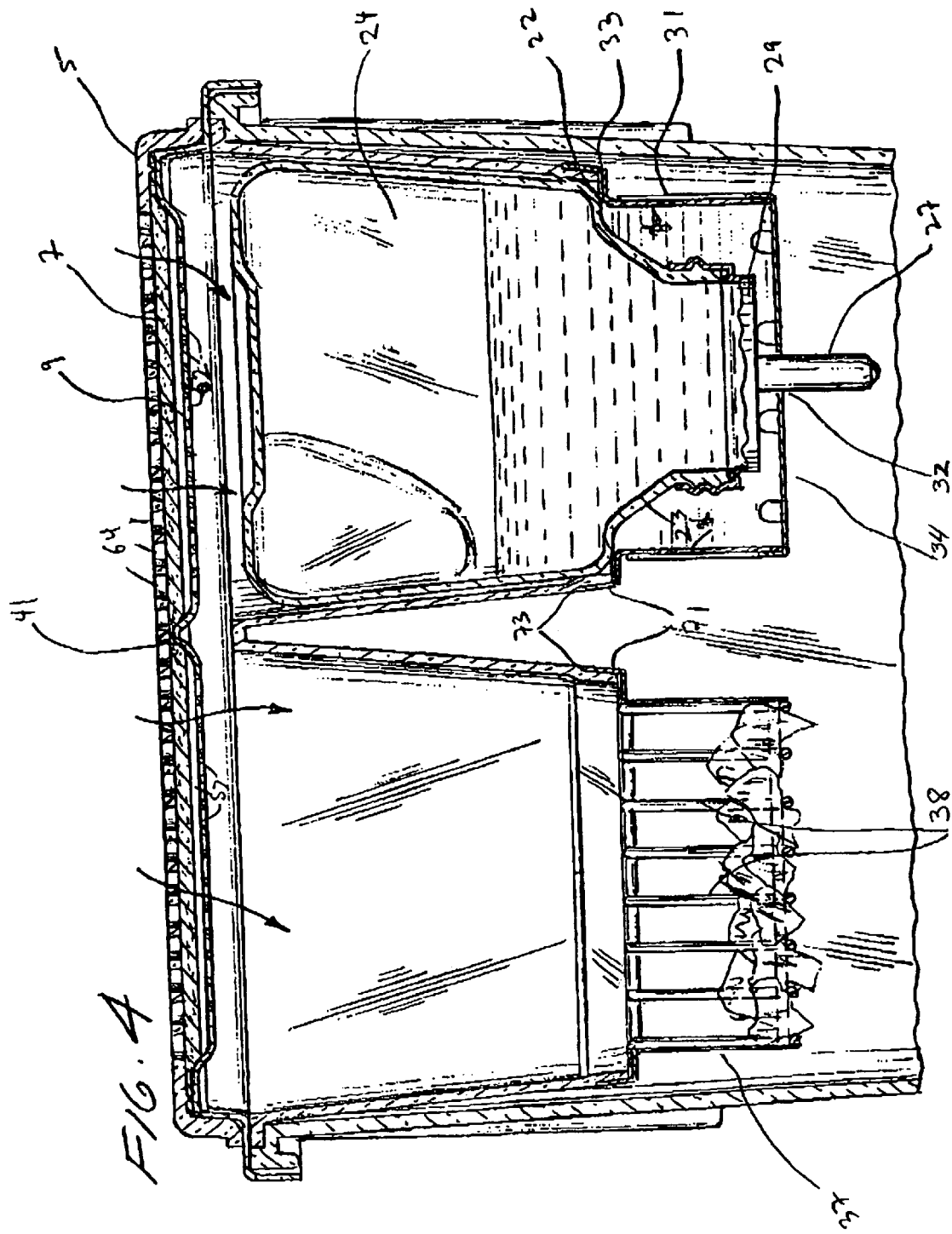

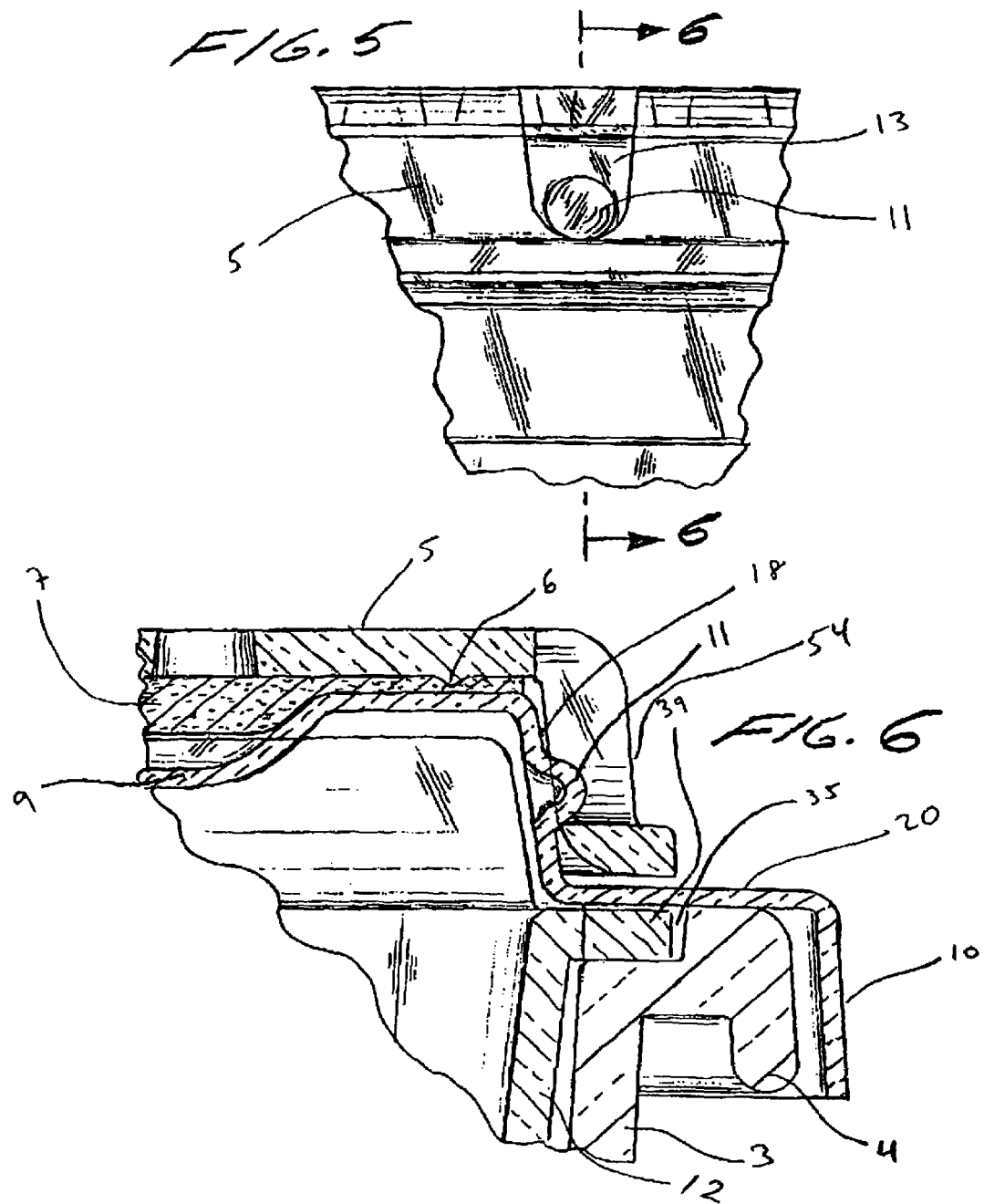

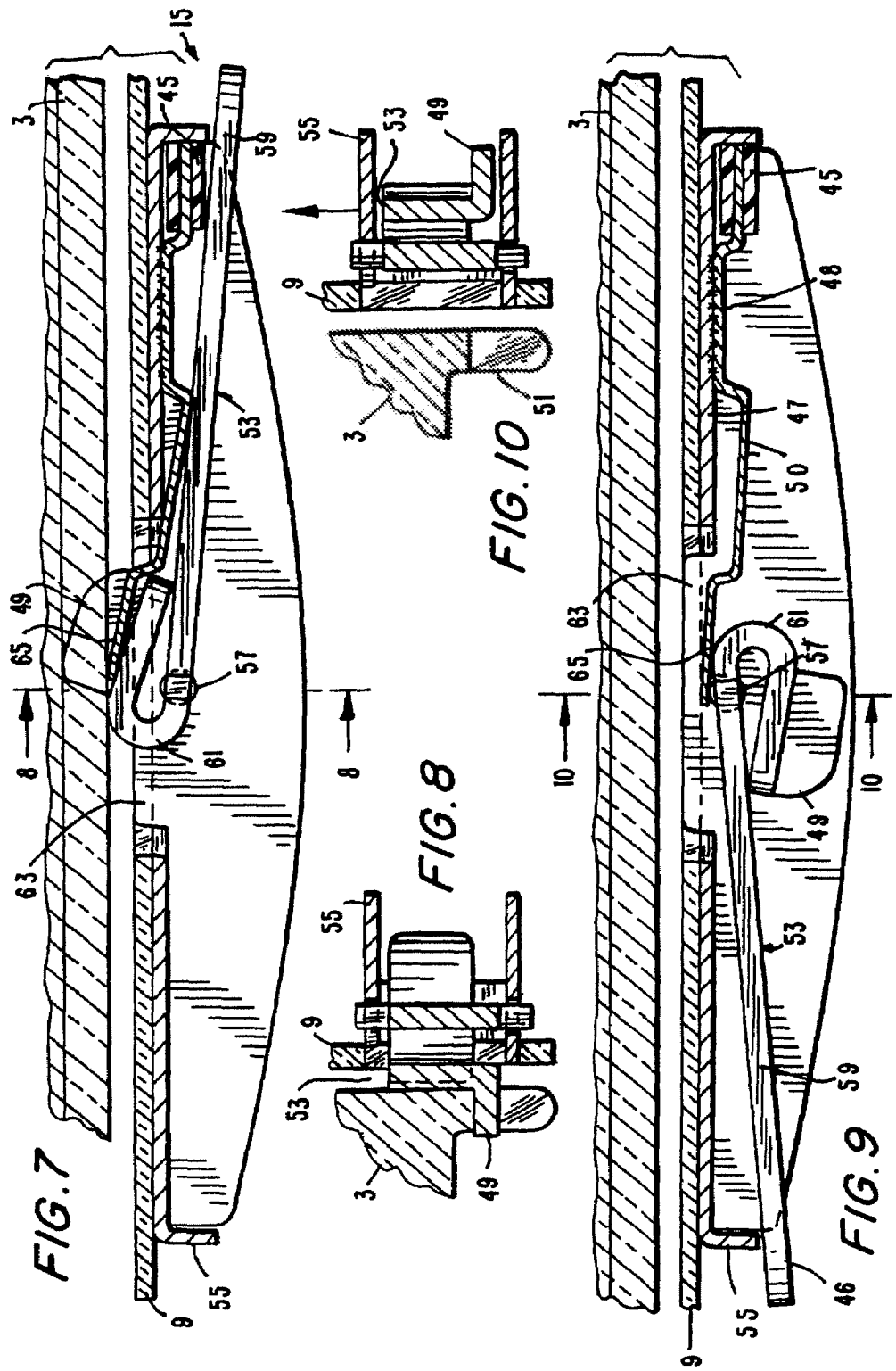

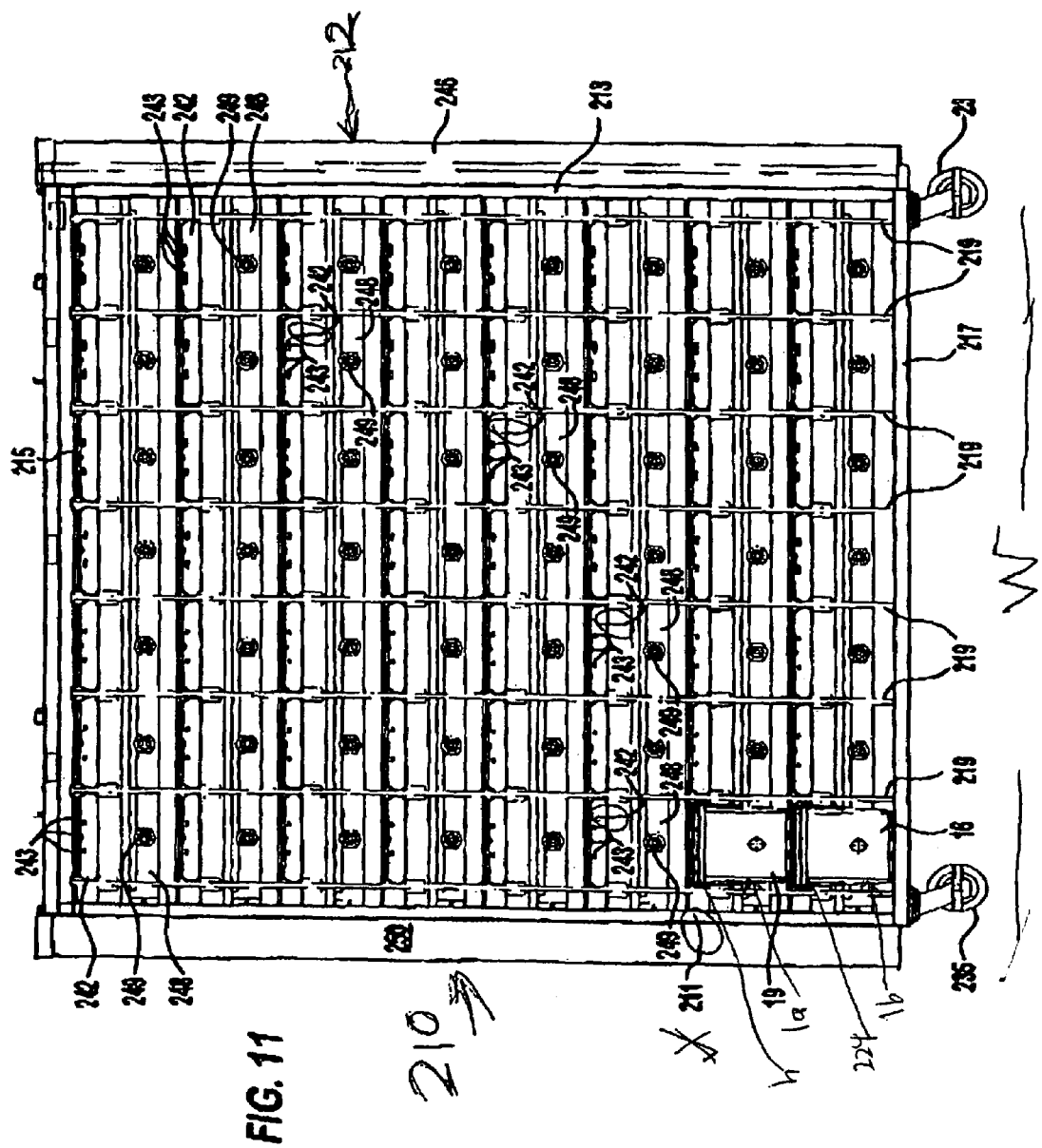

MULTIPURPOSE RAT CAGE

CROSS REFERENCE TO OTHER APPLICATIONS

This is a Continuation In Part application claiming priority from U.S. patent application Ser. No. 09/106,389 filed on Jun. 26, 1998 now U.S. Pat. No. 6,041,741 for Multispecies Rodent Cage.

BACKGROUND OF INVENTION

This invention relates generally to a multipurpose rat cage which may be used as a static unit or in connection with a ventilated cage and rack system for housing a variety of rodent types including but not limited to rats, mice, hamsters and guinea pigs.

Ventilated cage and rack systems are well known in the art. One such ventilated cage and rack system is disclosed in U.S. Pat. No. 4,989,545, assigned to Lab Products, Inc., in which an open rack system including a plurality of shelves, each formed as an air plenum is provided. A ventilation system is connected to the rack system for ventilating each cage in the rack. It is known to house rats for study in such a ventilated cage and rack system.

In prior art ventilated cage and rack systems, cages of different sizes are used to accommodate rodents of different types. These cage sizes are selected according to Institute Laboratory Animal Resources (ILAR) guidelines which set non-binding minimums for the size and dimension of cages for particular rodents. For example, for mice that weigh more than 25 grams, a cage having a floor dimension of at least 15 square inches per mouse is required. Similarly, rats up to 400 grams in size require a cage having floor dimensions of at least 40 square inches per rat. Similar requirements are mandated for hamsters and guinea pigs by the Animal Welfare Act (AWA).

A drawback of the prior art cages is that a variety of different cage sizes, necessary to support the different rodent types, must be inventoried and managed so that the appropriate cage size is available for a particular study. For example, the standard rat cage used in the art has a 140 square inch footprint providing for housing of up to three rats in each cage. On the other hand, the standard size for a mouse cage has become 75 square inches allowing up to five mice of 25 grams each to be housed therein. Rat cages are also taller than mice cages and therefore the wire bar lid holding food and water is higher from the ground in rat cages than mice cages, therefore one cannot readily house mice in the standard rat cage. This problem is exacerbated in large research facilities, for example, the National Institute of Health (NIH), where 20 to 30 different cage sizes have to be coordinated. Furthermore, each different cage size requires that the corresponding rack that supports the particular cage size and corresponding accessories be used. This forces the facility to inventory and manage a variety of different rack sizes as well.

As in any endeavor, real estate is at a premium in a research facility. Research facilities are only so large and can only accommodate a certain amount of racks. Furthermore, racks and cages must be sized to pass through the standard doors to provide sufficient mobility.

The largest cage racks have been for housing rat cages and generally have a length of about 84.42 inches, a depth of about 26.375 inches and a height of about 77.16 inches. These dimensions allow a rack supporting rat cages thereon to pass through a standard door having a height of 6 feet 8 inches and a width of 36 inches. A rack having these dimensions will accommodate up to thirty six standard rat cages and therefore will house one hundred and eight rats therein. A mouse rack will have a very similar footprint, namely, a rack having a height of about 77.9 inches, a width of about 75.25 inches and a depth of about 30 inches. Such a rack supports one hundred and forty cages, each cage having a substantially 75 square inch footprint. Since each cage accommodates five mice, the rack can accommodate seven hundred mice.

One disadvantage of prior art cage and rack systems is that the density of rat population supported by a single rack is relatively low compared to the density of the mouse population supported by the rack. Accordingly, it is desired to not only provide a cage which reduces the inventory of cages required to accommodate a number of species, but also to provide a cage and rack system which, within the standard size constraints of the rack, increases the density of the rat population per rack without substantially sacrificing the density of other species housed in the rat cage.

SUMMARY OF THE INVENTION

The present invention is for a rat cage used in a rack system that can support a variety of rodent types. In accordance with the present invention, the rat cage has a length $l$ and a width w such that 80 inches$\leq l \times w \leq$140 inches.

Accordingly, it is an object of the invention to provide a rat cage and rack system which increases the density of the rat population housed therein.

Another object of the present invention to provide a rat cage that can be used to efficiently house different rodent types.

Still other objects and advantages of the invention will in part be obvious and will in part be apparent from the specification.

The invention accordingly comprises the features of construction, combination of elements and arrangements of parts which will be exemplified in the construction here and after set forth, the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a cross sectional view taken along line 3-3 of FIG. 1;

FIG. 4 is a cross sectional view taken along line 4-4 of FIG. 1;

FIG. 5 is a cross sectional view taken along line 5-5 of FIG. 1;

FIG. 6 is a cross sectional view taken along line 6-6 of FIG. 5;

FIG. 7 is a cross sectional view taken along line 7-7 of FIG. 1;

FIG. 3 is a cross sectional view taken along line 8-8 of FIG. 7;

FIG. 9 is a cross sectional view of a lock constructed in accordance with invention in the unlocked position;

FIG. 10 is a cross sectional view taken along line 10-10 of FIG. 9;

FIG. 11 is a front elevational view of the cage and rack system constructed in accordance with the invention.

DETAILED DESCRIPTION OF THE PREFERRED EMBODIMENTS

Figure 1:
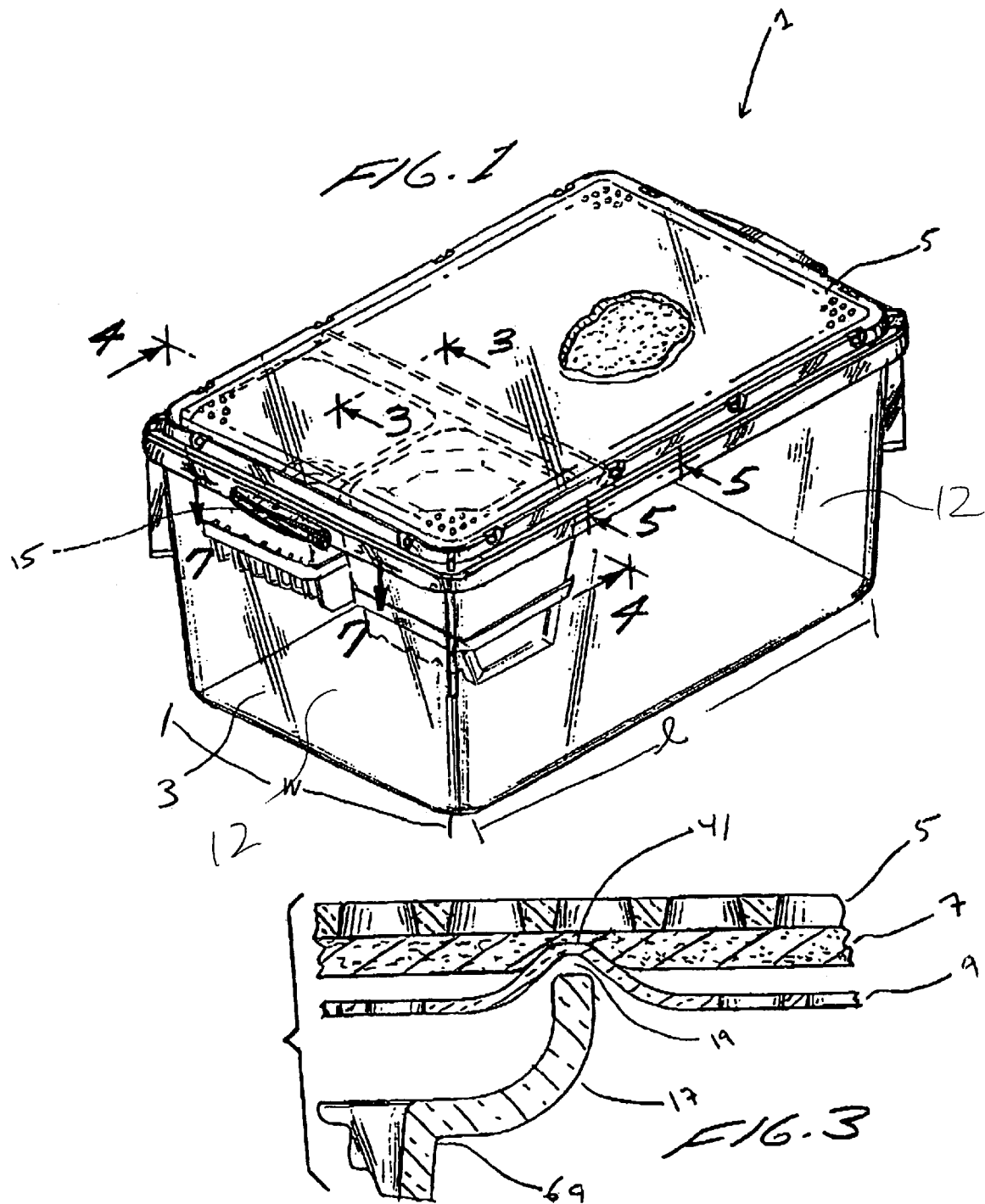
FIG. 1 is a perspective view of the multipurpose rat cage constructed in accordance with the present invention.
Figure 2:
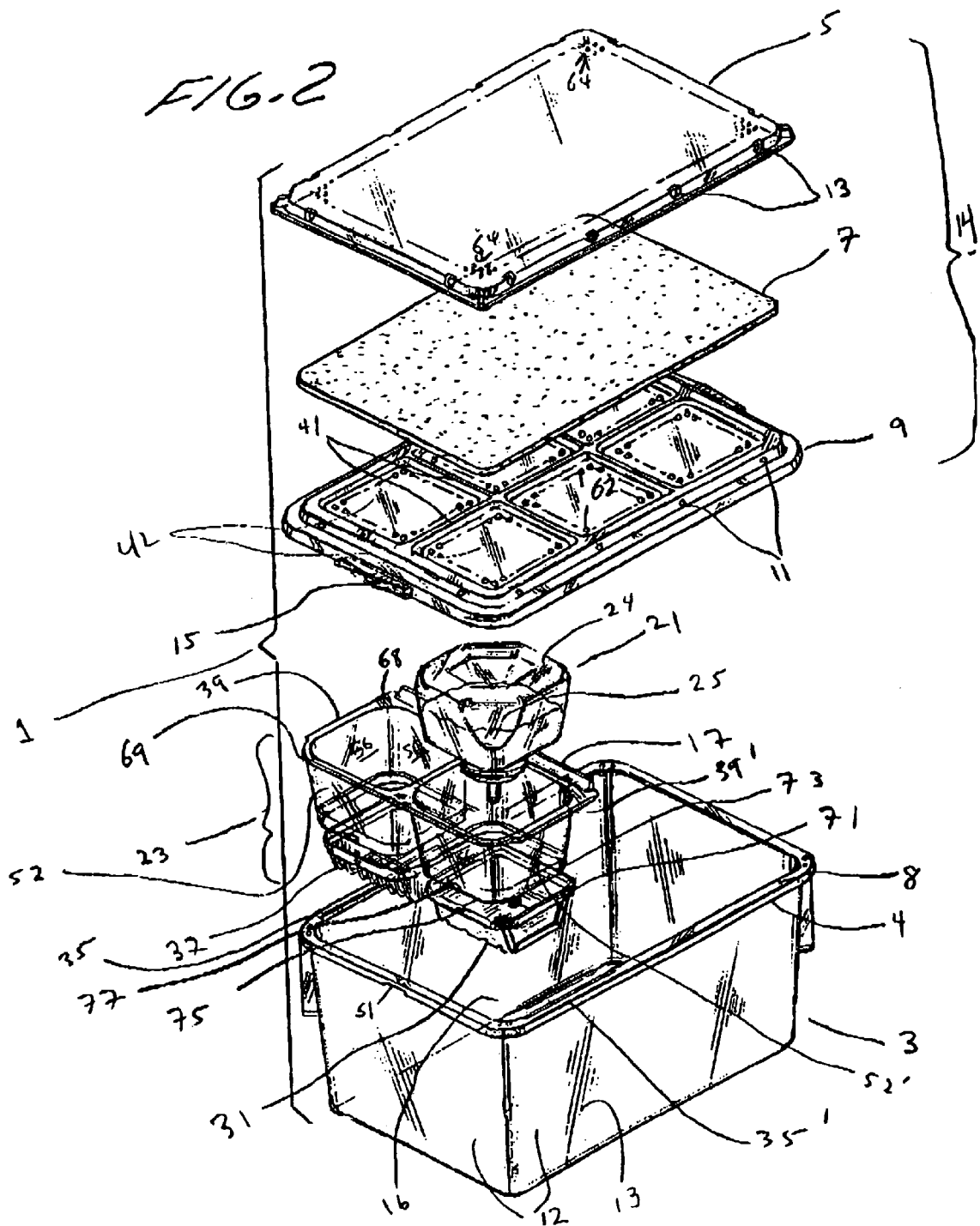
FIG. 2 is an exploded perspective view of the multipurpose rat cage constructed in accordance with the invention.

Referring now to FIGS. 1-6, there is shown a cage level barrier rat cage 1 constructed in accordance with the present invention. As used herein, the term "cage level barrier rodent cage" means a cage having walls and floor that collectively form a barrier at the cage level protecting both lab personnel and the animals contained within the cage from contamination. Rat cage 1 includes a cage bottom 3 having four integral side walls 12 and a floor 13. Cage bottom 3 also includes an open top end 16. Extending continuously around top end 16 of cage bottom 3 is a peripheral lip 8 having a smooth and flat surface. A rim 4 vertically descends from peripheral lip 8. A pair of recesses 35, 35' are formed in peripheral lip 8. In an exemplary embodiment, recess 35 is disposed in the portion of peripheral lip 8 adjacent a corner of cage bottom 3 while recess 35' is disposed in the portion of peripheral lip 8 that is opposite recess 35.

Although cage bottom 3 may be constructed from any suitable material, it is preferable that it be molded from transparent plastic so that the rat contained in cage bottom 3 can be monitored through side walls 12. Also, it is preferred that cage bottom 3 have rounded corners thereby preventing the rats from chewing on the corners and gnawing their way out of cage 1.

The dimension of cage bottom 3 is optimized to permit the housing of different rodent types, including mice, rats, hamster, gerbils and guinea pigs in conformance with ILAR and AWA guidelines. The dimension of cage bottom 3 is also optimized to permit the maximum number of rats to be supported by a rack having substantially the same footprint as the prior art rack footprint and allowing the rack with the cage therein to pass through the standard doorway having a width of 36 inches. It has been determined that an optimum cage has a footprint of between 80 square inches and 140 square inches. In other words, the area of the cage may be expressed as:

$$80 \text{ inches} \leq \ell \times w \leq 140 \text{ inches}$$

where $\ell$ is equal to the length of the interior floor space of the cage and w is equal to the width of interior floor space; the difference between the exterior and interior dimensions being insignificant for the purposes of the claimed invention. Furthermore, the length of the cage and/or the rack must be less than 36 inches so that a rack containing the cages when wheeled through a doorway can pass through the standard 36 inch doorway when the rack is a single sided rack.

In a preferred embodiment, cage bottom 3 is selected to have a size of approximately 80 square inches measured at the bottom of cage bottom 3 with a depth of approximately 7⅝ inches. Because many studies can begin housing two rats per cage, cage bottom 3 having an area of about 80 square inches can support two rats of up to 400 grams each. Once the rats grow, for example, in long-term studies, they will be placed in the same cage individually. Also, cage bottom 3 having an area of about 80 square inches can accommodate either a guinea pig or at least five mice while complying with ILAR and AWA guidelines. Thus, by selecting a rat cage bottom 3 having an area of about 80 square inches, a single cage 1 can be used to support a variety of rodent types. Accordingly, by standardizing cage bottom 3 having this dimension, a research facility will greatly simplify the inventory and management of cages 1 and racks.

A feeder assembly, generally indicated as 23, is supported in cage bottom 3 for providing food and water to the rats housed therein. Feeder assembly 23 includes a frame 69 having a platform portion 68.

Extending from two opposite sides of platform 68 are a pair of flanges 39, 39'. Flanges 39, 39' extend outwardly from frame 69 with flange 39 disposed on one side of frame 69 and flange 39' disposed on the opposite side of frame 69. Flanges 39, 39' may be either integrally formed with frame 69 or separately formed and then fixed to frame 69 thereafter. Flanges 39, 39' are dimensioned and shaped so that when feeder assembly 23 is disposed in cage bottom 3, flanges 39, 39' are received in recesses 35, 35', respectively, and are flush with peripheral lip 8 of cage bottom 3.

A lip 17 extends along a front of platform 68 which is intermediate the sides of frame 69 containing flanges 39, 39'. Lip 17 extends upward and away from frame 69. Feeder assembly 23 is placed in cage bottom 3 so that lip 17 extends toward the center of cage 1. In an exemplary embodiment, lip 17 is smooth and curved to prevent rats in cage bottom 3 from purchasing on lip 17 or feeder assembly 23 to either gain access to the food and water contained in feeder assembly 23 from above or from purchasing for gnawing at feeder assembly 23. Also, lip 17 serves as a handle for positioning feeder assembly 23 in cage bottom 3.

A first support 52 and a second support 52' depend from platform 68 and form open ended polygons suspended therefrom. Supports 52, 52' have sides 56. Supports 52 and 52' of feeder assembly 23 can be adapted to support either food or water for the rats housed in cage bottom 3. To adapt support 52 for food, a snap on food holder 37 is attached to the bottom of support 52. A skirt 73 is disposed around the circumference of the bottom of supports 52, 52'. Food holder 37 includes a peripheral rim 71. Descending from peripheral rim 71 is a plurality of U-shaped bars 38 on food holder 37. U-shaped bars 38 are spaced apart so that food disposed in support 52 is retained by food holder 37 but yet allows the rats in cage bottom 3 to remove the food from between U-shaped bars 38 of food holder 37. Rim 71 is dimensioned to receive channel 74 and secure rim 71 to support 52 or 52'. It also provides a flush continuous surface eliminating purchase points and protecting the edges of skirt 73 from the animal. A recess 77 is disposed on skirt 73. A lock tab 75 is disposed on rim 71. Lock tab 75 and recess 77 are dimensioned and positioned so that when food holder 37 is connected to support 52, lock tab 75 is inserted into recess 77 thereby securing food holder 37 to support 52. In a preferred embodiment rim 71 is flush with the side 56 of support 52 or 52' so that rats cannot perch on rim 71 or sides 56. In a preferred embodiment, food holder 37 is constructed from stainless steel so that the rats are prevented from gnawing through food holder 37 and support 52.

Either support 52 or 52' may also be adapted to receive a water bottle 21 to provide water to the rats in cage bottom 3. To adapt support 52 for water, a water bottle support 31 is secured to the bottom of support 52. As with food holder 37, water bottle support 31 includes a rim 71 having a recess 77 so that when rim 71 is placed about skirt 73 of support 52, recess 77 mates with lock tab 75 and rim 71 fits about skirt 73 so that rim 71 is flush with the sides 56 of support 52. Descending from rim 71 of water bottle support 31 are four integral walls and a floor 34. The walls 36 of water bottle support 31 are inwardly offset from rim 71 of water bottle support 31 thereby forming a shoulder 33 between walls 36 and rim 71 around the inside circumference of water bottle support 31. A floor 34 is supported by walls 36. Located in the center of floor 34 is a hole or slot 32. In a preferred embodiment, water bottle support 31 is constructed of stainless steel so that the rats in cage bottom 3 are prevented from gnawing through water bottle support 31 and support 52.

By providing a feeder assembly having interchangeable feeder and water bottle snap on components, the height at which food and the water extend into the cage can be adjusted for the particular various species being housed therein. Therefore, the problem of providing food to a plurality of different species of different sizes has been addressed while utilizing a single cage size.

It is preferred that supports 52 and 52' be constructed from transparent plastic so that the food levels in supports 52 and 52' can be monitored through side walls 12. Supports 52 and 52' may be formed in any suitable shape including conical and rhomboidal but are preferably a rounded polygon to prevent chewing and maximize volume. Supports 52, 52' are radiused at the corners to sufficiently prevent chewing by the animal. Studies have shown that by way of example a radius of about 1 inch at the top tapering to ⅞ of an inch at the bottom has been sufficient. Support 31 and feeder holder 37 may also be formed of plastic. The corners would be sufficiently radiused to prevent gnawing by the animal.

Figure 12:
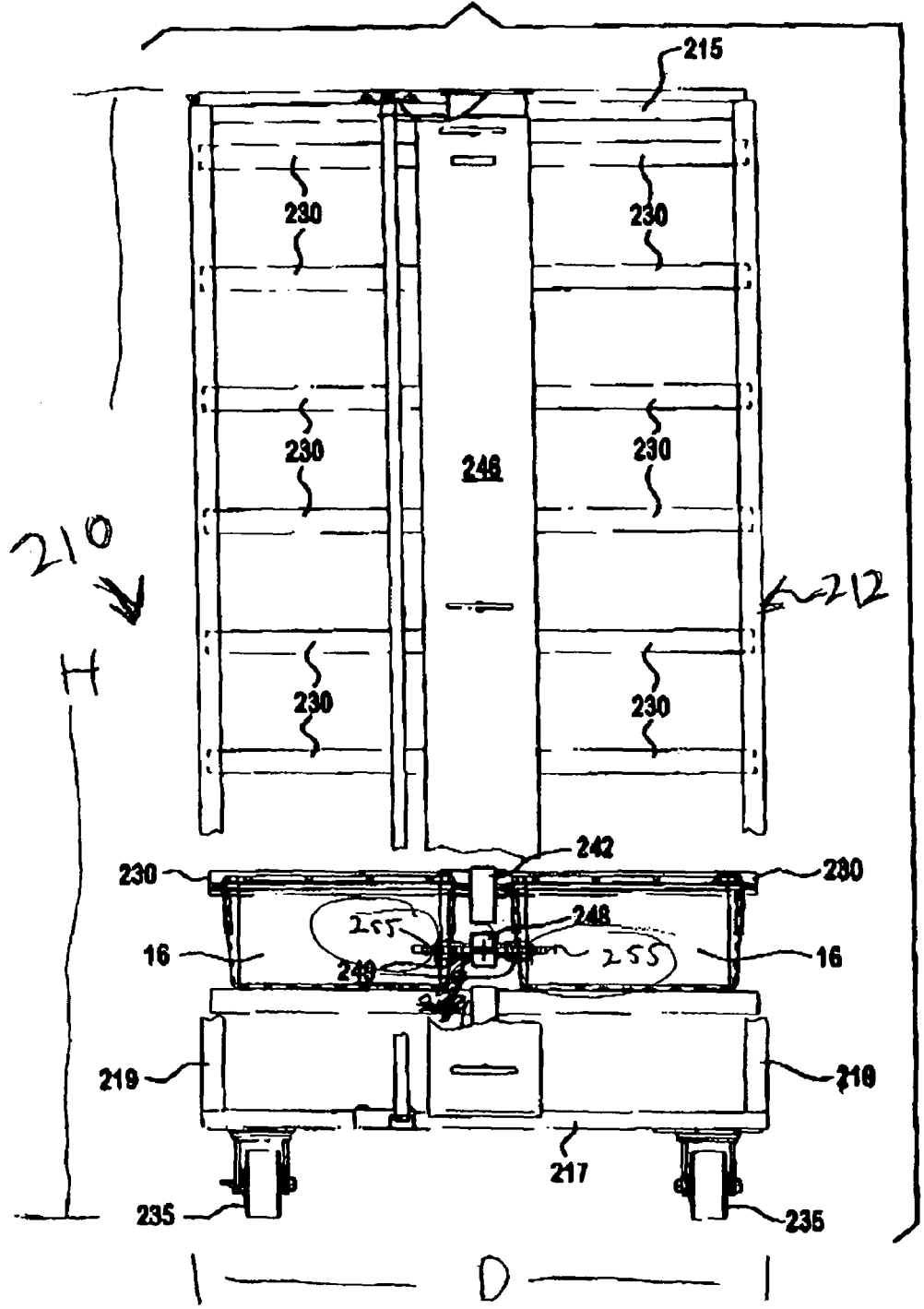
FIG. 12 is a side elevational view of the cage and rack system constructed in accordance with the invention.

Because supports 52, 52' can each hold both food or water it is possible to double the food capacity by utilizing two feedholders 37 and a rack watering valve 255 (FIG. 12). This extends the life of the study and reduces the number of times that the top must be removed.

Water bottle 21 includes a main body 24 for containing water that is preferably dimensioned and shaped to mate with support 52. Main body 24 substantially fills support 52 so that the water capacity of water bottle 21 is maximized. It is also preferable that main body 24 be constructed from a transparent material so that the amount of water remaining in water bottle 21 can be monitored through side walls 12 and the walls of supports 52, 52'. The top portion of main body 24 includes a pair of molded recesses 25 disposed on opposite sides of main body 24 so that water bottle 21 may be easily gripped and removed from support 52. Water bottle 21 is positioned in support 52 in a substantially vertical orientation so that substantially all the water stored in water bottle 21 will drain out therefrom.

Main body 24 is tapered in a manner which forms a shoulder 22 around the circumference of main body 24 which extends into a neck 23. As a result, when water bottle 21 is placed in support 52, shoulder 22 contacts ledge 33 of support 52 thereby supporting water bottle 21 in support 52.

Neck 23 of main body 24 narrows to an opening into which a rubber stopper 29 is inserted or screw cap is placed. A tube 27 extends from rubber stopper 29. When water bottle 21 is placed into support 52, tube 27 is inserted through the hole or slot in floor 34 of water bottle support 31 and extends into cage bottom 3 thereby providing the rats in cage bottom 3 with access to the water in water bottle 21.

Top end 16 of cage bottom 3 is covered with a bonnet 14. Bonnet 14 includes three parts that are connected together into one unit: a top 9, a filter 7 and a filter retainer 5. The parts of bonnet 14 are arranged so that top 9 is in direct contact with top lip 8 of cage bottom 3, filter 7 is disposed on top 9 and filter retainer 5 is placed on top of filter 7 and is secured to top 9 thereby forming a unitary structure.

In an exemplary embodiment, top 9 is dimensioned and shaped to cover and effectively seal top end 16 of cage bottom 3. Top 9 is formed from a resilient material, by way of example stainless steel or plastic designed without purchase points, so that the rats in cage 1 are prevented from gnawing through bonnet 14 to filter 7. Top 9 is also perforated, having a plurality of air passages 62, across its surface so that air can pass through top 9 into cage bottom 3. The top surface of top 9 includes a series of cross beams 41 for supporting filter 7 away from the holes separating filter 7 from access by the animals contained within the cage. Cross beams 41 divide the surface of top 9 into a plurality of areas 42.

Opposite cross beams 41 on the bottom surface of top 9 are a series of receiving portions 19. As seen in FIG. 3, receiving portions 19 are dimensioned and shaped so that when top 9 is placed on cage bottom 3 containing feeder assembly 23, lip 17 is introduced in receiving portion 19 that is adjacent lip 17 thereby creating a barrier to supports 52 and 52' of feeder assembly 23. In this way, rats in cage bottom 3 are prevented by lip 17 from gaining access to the food or water in support 52 from above. This also prevents access to lip 17 by the animal, preventing chewing of lip 17 itself. Also, because top 9 will not be properly seated on cage bottom 3 unless lip 17 is mated with receiving portion 19, this ensures that feeder assembly 23 is properly positioned in cage bottom 3 before cage 1 is closed by bonnet 14.

Along the periphery of top 9 is a descending rim 18. Disposed on rim 18 and protruding from top 9 are a plurality of detents 11. Extending from descending rim 18 along the periphery of top 9 is a horizontal flange 20. Vertically descending from flange 20 is a skirt 10. When top 9 is placed on cage bottom 3, flange 20 is seated flush on peripheral lip 8 of cage bottom 3 thereby minimizing the amount of air that flows out from the perimeter of top 9 thus maximizing the air flowing through filter 7. Also, because flanges 39, 39' of feeder assembly 23 are positioned within recesses 35, 35' and are flush with peripheral lip 8, top 9 forms a seal with cage bottom 3 along the entire periphery of cage bottom 3. Furthermore, skirt 10 which extends around rim 4 improves the seal formed between top 9 and cage bottom 3 by creating a circuitous path for air travel between the interior of cage 1 and the outside thereby inhibiting air from entering or leaving cage 1 at this junction point. In a exemplary embodiment, an additional sealing member, for example silicon or rubber material, may be applied to either or both flange 20 peripheral lip 8 thereby providing an O-ring type seal further limiting air passage via this route.

Filter 7 is placed on top of top 9 and is supported by cross beams 41 away from areas 42 to prevent contact with rats. Filter retainer 5 is placed on top of filter 7 and is dimensioned and shaped so as to cover the entire filter 7. Filter retainer 5 is also perforated, containing holes 64 throughout its surface thereby allowing air to pass through filter 7. Protruding from the bottom surface of filter retainer 5 and extending around the bottom surface of filter retainer 5 is a track 6. When filter retainer 5 is mounted on filter 7, track 6 compresses filter 7 against the top surface of top 9 thereby securing filter 7 in place and preventing air from leaking past the filter in any direction.

A descending border 54 extends from the outer periphery of filter retainer 5. A plurality of windows 13 are formed in border 54 of filter retainer 5. Windows 13 are dimensioned and positioned so that when filter retainer 5 is mounted on top of filter 7, windows 13 receive detents 11 of top 9, respectively, thereby securing filter retainer 5 to top 9. In this way, filter retainer 5, filter 7 and top 9 of bonnet 14 form a unitary structure.

Top 9 may be made of plastic. To further prevent the animal from purchasing on top 9, air passages 62 are radiused to provide a smooth curved surface facing the animal. Passages 62 are also dimensioned to prevent the animal's nose, claws or teeth from reaching the filter.

Reference is now made to FIGS. 11 and 12, wherein a ventilated cage and rack system, generally indicated at 210 for supporting cages 1, constructed in accordance with the invention is shown. System 210 includes a rack 212. In a preferred embodiment rack 212 is a double sided rack each side being symmetrical with the other and only the front side being described for ease of analysis. Ventilated cage and rack system 210 includes an open rack 212 having a left side wall 211 and a right side wall 213, a top 215, and a bottom 217. A plurality of posts 219 are disposed in parallel between top 215 and bottom 217. Vertical posts 219 are preferably narrow and may comprise walls extending substantially from the front of rack 212 to the rear of rack 212, or may each comprise two vertical members, one at or near the front of rack 212 and the other at or near the rear of rack 212 (FIG. 12).

A plurality of rat cages 1 may be positioned within rack 212. Each cage is positioned within rack 212 by a canopy, generally indicated at 230. Each canopy 230 shrouds a cage 1 below a canopy 230. Accordingly, each canopy 230 is shaped and positioned so as to substantially surround the top 9 of the cage 1b while maintaining a short gap h between top 9 and canopy 230. Perforations 243 are positioned adjacent each of canopies 230. Gap h should be sufficient to allow movement of gases between canopy 230 and top 9, and top 9, and in an exemplary embodiment gap h is 3/16 of an inch to 1/4 of an inch. Canopy 230 profiles bonnet 14, preferably creating a tension fit against the sidewall of bottom 3 of cage 1b. The rear of canopy 230 contacts air exhaust plenum 242.

Canopies 230 are disposed in parallel columns in rack 212 between each pair of adjacent posts 219, or between left side wall 211 and an adjacent post 219, or between right side wall 213 and an adjacent post 219. Each canopy 230 supports a first cage 19 above the canopy 230 in the rack 212 and shrouds the filter cap 224 of a second cage 1b below the canopy 230 in the rack 212. The bottom portion 3 of the first cage 1a rests on top of the corresponding canopy 230. Of course, those canopies positioned at the top row of rack 212 do not support a cage 1 above them, and those cages 1 positioned on the bottom row of rack 212 preferably supported by bottom 217 of rack 212. When positioned in the rack, each cage 1 communicates with air supply plenum 240 through cage coupling. Such cage couplers 249 are known in the art, and are disclosed, for example in U.S. Pat. Nos. 4,989,545 and 5,042,429 assigned to Lab Products, Inc. Air supply plena 240 may also include water valves 255 for delivering a supply of water to cages 1 through cage coupling 249, as is also known in the art. Canopies 230 are preferably constructed of a lightweight, transparent material which is substantially rigid, such as clear plastic. Such clear plastic canopies provide enhanced visibility of cages 1 within rack system 210 and reduce the overall weight of rack system 210.

Each canopy 230 is preferably mounted to air plenum 242 at the rear and to two posts 219 at the front of rack 212. Perforations 243 are disposed within an area outlined by canopy 230 to remove air within gap h. Each post 219 preferably comprises a vertical T-beam, with a first face being disposed substantially parallel to the direction of insertion of a cage 1 into rack 212 and a second face being disposed substantially perpendicular to the direction of insertion. To maximize horizontal cage density within rack 212, the first face of post 219 is preferably made as narrow as possible while still providing structural support for rack 212. By providing such a notched T-beam post 219 on each side of canopy 230, canopy 230 may be supported on both sides from the front of rack 212. Other means of providing the support of posts 219 are contemplated by the invention. For example, a notched L-beam post 219 could be used, thereby providing support to only one side of canopy 230 from the rack, or canopies 230 could be screwed to a flat vertical panel disposed parallel the cage insertion direction and extending from the top to the bottom of rack 212. Rack 212 is provided with wheels 235 for mobility.

In a preferred embodiment, the rack 212 has a width W of 86.25 inches, a depth D of 32.5 inches and a height H of 79.875 inches. A limitation on the rack is that it should fit through a standard door. To achieve this result, height of the rack can be no greater than 80 inches and the depth of the rack with cages stacked on either side, if a dual sided rack, can be no greater than 36 inches. In a preferred embodiment, rack 212 supports one hundred and twelve cages 1. Because the cages have a floor space of between 80 inches and 140 inches, they hold a minimum of two rats per cage for a total of two hundred twenty four rats between 300 and 400 grams each. Alternatively, at least five mice of up to 25 grams can be housed per cage yielding five hundred sixty mice for the entire rack. This is in comparison with prior art rat units which had a width of 85.063 inches, a depth of 26.375 inches and a height of 65.062 inches and which housed only thirty-six 140 square inch cages. Placing three rats into each of the prior art cages yielded one hundred and eight rats. Accordingly, the number of rats housed in the present rack is an increase of 107% over the number of rats housed in prior units without a corresponding increase in rack footprint. At the same time, the reduction in the number of mice housed in a rat cage of the type disclosed herein as compared to the rack specifically designed for mice is a reduction of less than 20%. Accordingly, the efficiency of the overall rack system for housing both mice and rats is increased.

Reference is now made to FIGS. 7-10. A lock 15 is mounted on skirt 10 of top 9. Lock 15 includes a channel-shaped lock housing 55 that is fixed to skirt 10. Lock spring 47, disposed in housing 55, includes a visual alert 45 portion upon which is mounted a visual alert 46, a securing portion 48, a tension portion 50 and a biasing portion 65. Lock spring 47 is positioned in housing 55 so that biasing portion 65 is adjacent the center of housing 55. Lock spring 47 is secured to housing 55 by connecting securing portion 48 to the back wall of housing 55 using any suitable technique, such as welding or gluing. In an exemplary embodiment, lock spring is constructed from a hard, resilient material, such as a strip of metal, and is shaped so that visual alert portion 45 and tension portion 50 are spaced away from the back wall of housing 55. Mounted in the center of housing 55 is a pivot 57. Lock spring 47 is of a sufficient length so that biasing portion 65 extends to a point intermediate pivot 57 and the back wall of housing 55.

A lock bar 53 is disposed in housing 55 and includes an arm 59 and a curved portion 61 at an end of arm 59. Lock bar 53 is rotatably mounted on pivot 57 at an end of arm 59 that is adjacent curved portion 61. Lock bar 53 is of a sufficient length so that a portion of arm 59 extends outside housing 55 when lock 15 in either the locked or unlocked position so that lock bar 53 may be easily gripped and rotated. A lock flange 49 extends horizontally from a lower edge of curved portion 61 of lock bar 53.

When lock bar 53 is rotated away from lock spring 47, lock flange 49 faces away from cage bottom 3 and lock 15 is in the unlocked portion. In this position, biasing portion 65 is biased against the portion of lock bar 53 that is adjacent pivot 57 thereby keeping lock bar 53 from rotating towards lock spring 47 and keeping lock 15 in the unlocked position. In the unlocked position, visual alert 45, preferably a readily visible member such as a yellow tab, is exposed indicating that lock 15 is unlocked.

When lock bar 53 is rotated to lock spring 47, lock flange 49 is inserted into a notch 51 disposed in cage bottom 3 thereby securing top 9 to cage bottom 3. While in the locked position, biasing portion 65 is biased against curved portion 61 of lock bar 53 at a point that is vertically adjacent to lock flange 49 thereby keeping lock bar 53 from rotating away from lock spring 47 and keeping lock 15 in the locked position. Also, because lock bar 53 covers visual alert 45 when lock bar 53 is rotated towards lock spring 47 into the locked position, the locked cages 1 are readily distinguishable from the unlocked cages 1.

Rat cage 1 constructed in accordance with the present invention offers many advantages over prior art cages. First, because the dimension of cage bottom 3 is optimally selected to have an area substantially between 80 and 140 square inches, cage 1 can be used for mice, rats, hamsters and guinea pigs while confirming to ILAR guidelines. By providing a universal cage size, the need for storing and managing different size cages and different size racks to support the different cage sizes is eliminated. Also, because feeder assembly 23 is modular and adaptable by snapping on either water bottle support 31 or food holder 37, as needed to support the varying eating requirements of the different studies and rats, storage and maintenance of feeder assembly 23 is greatly simplified.

The durability and reliability of cage 1 of the present invention is also improved. Also, rounded lip 17, extending from feeder assembly 23, which is received by receiving portion 19 of top 9, prevents rats from perching and accessing food in feeder assembly 23 from above. In addition, radiusing supports 52, 52' of feeder 23 eliminates purchase points on the feeder. Furthermore, by mounting either water bottle support 31 or food holder 37, both made of stainless steel, to the bottom of supports 52, 52' of feeder assembly 23, the rats are prevented from gnawing through the bottom of feeder assembly 23. Also, by forming top 9 from stainless steel, or radiusing passages 62 in plastic the rats will be unable to gnaw through bonnet 14. Finally, by including lock 43 on bonnet 14, the rats housed in cage bottom 3 will be unable to displace bonnet 14 and escape.

Furthermore, the ventilation of the cage is greatly improved by eliminating the wire lid that was used in prior art cages and reducing the Venturi effect therein. Also, because flanges 39, 39' are mounted flush in feeder recesses 35, 35', respectively, bonnet 14 forms an improved seal with cage bottom 3 preventing air from passing through this junction and forcing more air through filter 7. In addition, by providing a sealing member such as rubber or silicon along the junction between top 9 and cage bottom 3, the seal is further improved and ventilation through filter 7 is increased.

Cage 1 constructed in accordance with the present invention is also easier to use than the prior art cages. First, because cage bottom 3 is constructed from transparent material, visibility of the rats in cage bottom 3 is improved. Also, by inserting feeder assembly 23 at the rear of cage bottom 3, visibility and access to the animals is improved. Furthermore, because sections 52, 52' of feeder assembly 23 is constructed from clear plastic, inspection of the food and water levels in feeder assembly 23 is facilitated without having to remove bonnet 14. By supporting the water bottle in a substantially vertical position, not only does substantially all of the liquid flow from the bottle, but the bottle utilizes less cage volume than if oriented at an angle. Also, by using water bottle 21 having molded recesses 25, the insertion and removal of water bottle 21 from section 52 is simplified and eliminating the step of separately removing the lid and setting it aside. In addition, because bonnet 14 is formed as a unitary structure, top 9, filter 7 and filter retainer 5 may be removed from cage bottom 3 in one piece thereby easing access to the interior of cage bottom 3. In addition, because filter retainer 5 may be removed from top 9 while top 9 is still secured to cage bottom 3, filter 7 may be inspected and changed while keeping the rats securely locked in cage bottom 3. Finally, visual alert 45 of lock 43 simplifies the determination of which cages 1 are in the unlocked position.

It will thus be seen that the objects set forth above, and those made apparent from the preceding description, are efficiently obtained and, because certain changes may be made in the above constructions without departing from the spirit and scope of the invention, it is intended that all matter contained in the above description are shown in the accompanying drawings shall be interpreted as illustrative and not in an limiting sense.

It is also to be understood that the following claims are intended to cover all the generic and specific features of the invention herein described, and all statements of the scope of the invention which, as a matter of language, might be said to fall therebetween.

The invention claimed is:

1. A cage assembly for housing a plurality of types of animals, the cage assembly comprising:
   a cage bottom having a floor and a plurality of integral side walls extending up from the floor to side wall top edges, the side walls defining an open top end,
   said floor having a length l and a width w wherein
   80 square inches $\leq$ l×w $\leq$ 110 square inches; and
   a feeder assembly having a flange, a frame, and at least one support descending from said frame; a pair of flanges extending from said frame to contact the side wall top edges to support said frame within said cage, said at least one support having an open lower end and further comprising a snap on bottom, said snap on bottom being selectively connected to said lower end of said at least one support; a cage bottom for housing an animal, the cage bottom being constructed and arranged to receive the flange of the feeder assembly to support the feeder assembly with respect to the cage bottom, the cage bottom and feeder assembly working together to provide food and water to animals of different sizes.

2. The cage assembly of claim 1, wherein l×w is substantially 80 square inches.

3. The cage assembly of claim 1, wherein the feeder comprises one or more selectively attachable components for adjusting the height of the feeder.

4. A cage level barrier cage ventilated rack and cage system for housing a plurality of types of rodents including a plurality of mice or rats within a cage, the system comprising
   a double sided rack, the rack having a depth;
   at least one cage disposed in said rack, said cage having a cage bottom, the cage bottom having a plurality of integral side walls having side wall top edges and a plurality of recesses formed in the side wall top edges, a floor and an open top, and the length of the cage being less than substantially 18 inches;
   the cage further comprising a feeder assembly having a plurality of flanges received in at least some of the recesses in the top edges of the side walls of the cage bottom to make food and/or fluids available to animals housed in the cage bottom a feeder assembly also including a frame, and at least one support descending from said frame; a pair of flanges extending from said frame to support said frame within said cage, said at least one support having an open lower end and further comprising a snap on bottom, said snap on bottom being selectively connected to said lower end of said at least one support.

5. A cage level barrier cage ventilated rack and cage system for housing a plurality of types of rodents including a plurality of mice or rats within a cage, the system comprising:
- a double sided rack, the rack having a depth; and
- a cage disposed in said rack, said cage having a cage bottom, the cage bottom having a plurality of integral side walls having recesses in the tops thereof, a floor and an open top, and the length of the cage being less than substantially 18 inches;
- wherein said cage bottom has a length l and a width w, and wherein 80 square inches≦l×w≦110 square inches;
- the cage further comprising a feeder assembly having a plurality of flanges received in at least some of the recesses in the side walls of the cage bottom, the feeding assembly constructed and arranged to make food and/or fluids available to animals housed in the cage bottom a feeder assembly also including a frame, and at least one support descending from said frame; a pair of flanges extending from said frame to support said frame within said cage, said at least one support having an open lower end and further comprising a snap on bottom, said snap on bottom being selectively connected to said lower end of said at least one support.

6. A cage level barrier cage ventilated rack and cage system for housing a plurality of types of rodents including a plurality of mice or rats within a cage, the system comprising:
- a double sided rack, the rack having a depth; and
- a cage disposed in said rack, said cage having a cage bottom, the cage bottom having a plurality of integral side walls having recesses therein, the cage having a floor and an open top, and the length of the cage being less than substantially 18 inches, the cage further comprising a feeder assembly having a flange received in at least one of the recesses in the side walls of the cage bottom to make food and/or fluids available to animals housed in the cage bottom a feeder assembly also including a frame, and at least one support descending from said frame; a pair of flanges extending from said frame to support said frame within said cage, said at least one support having an open lower end and further comprising a snap on bottom, said snap on bottom being selectively connected to said lower end of said at least one support;
- wherein said rack has a depth and said cage rests within said rack so that said length of said cage at least partially overlaps said depth of said rack and a portion of said cage extends beyond said rack, the portion having a length and the sum of the length of the portion and the depth of said rack is less than or equal to substantially 36 inches.

7. A cage assembly for housing a plurality of sizes of animals, the cage assembly comprising:
- a feeder assembly having a flange, a frame and at least one support descending from said frame having an open lower end and further comprising a snap on bottom, said snap on bottom being selectively connected to said lower end of said at least one support; and
- a cage bottom for housing an animal, the cage bottom having a plurality of integral side walls having recesses therein being constructed and arranged to receive the flange of the feeder assembly in the recesses to support the feeder assembly with respect to the cage bottom;
- the cage bottom and feeder assembly working together to provide food and water to animals of different sizes.

8. A cage assembly for housing a plurality of sizes of animals, the cage assembly comprising:
- a feeder assembly having a flange;
- a cage bottom for housing an animal, the cage bottom being constructed and arranged to receive the flange of the feeder assembly to support the feeder assembly with respect to the cage bottom, the cage bottom and feeder assembly working together to provide food and water to animals of different sizes;
- a frame;
- at least one support descending from said frame; and
- a pair of flanges extending from said frame to support said frame within said cage, said at least one support has an open lower end and further comprising a snap on bottom, said snap bottom being selectively connected to said lower end of said at least one support.

9. A cage assembly for housing a plurality of types of animals, the cage assembly comprising:
- a cage bottom having a floor and a plurality of integral side walls extending up from the floor to side wall top edges, said top edges having a plurality of recesses therein, the side walls defining an open top end,
- said floor having a length l and a width w wherein 80 square inches≦l×w≦110 square inches:
- a feeder assembly having a plurality of flanges, the flanges received in at least some of the recesses in the side walls of the cage bottom the feeder assembly constructed and arranged to make food and/or fluids available to animals housed in the cage bottom;
- a frame;
- at least one support descending from said frame; and
- a pair of said flanges extending from said frame to support said frame within said cage, said at least one support has an open lower end and further comprising a snap on bottom, said snap bottom being selectively connected to said lower end of said at least one support.

10. The cage assembly of claim 9, wherein said snap on bottom has an upper lip extending there around, and having a channel extending around said lower end, said upper lip receiving said channel to connect said snap on bottom to said at least one support.

11. The cage assembly of claim 10, wherein said upper lip has a recess and said lower end has a tab, being received by said recess for locking said snap on bottom to said at least one support.

12. The cage assembly of claim 9, wherein said snap on bottom is a food container.

13. The cage assembly of claim 9, wherein said snap on bottom is a water bottle support.

14. The cage assembly of claim 9, wherein said snap-on bottom has an opening therein.

15. The cage assembly of claim 9, wherein said snap on bottom forms a flush surface with said at least one support.

* * * * *